United States Patent
Takahashi

(10) Patent No.: US 11,832,032 B2
(45) Date of Patent: Nov. 28, 2023

(54) OPTICAL SUBMARINE BRANCHING APPARATUS, OPTICAL SUBMARINE CABLE SYSTEM, SWITCHING METHOD, AND NON-TRANSITORY COMPUTER READABLE MEDIUM

(71) Applicant: NEC Corporation, Tokyo (JP)

(72) Inventor: Masaki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 17/617,990

(22) PCT Filed: Jan. 21, 2020

(86) PCT No.: PCT/JP2020/001841
§ 371 (c)(1),
(2) Date: Dec. 10, 2021

(87) PCT Pub. No.: WO2020/255466
PCT Pub. Date: Dec. 24, 2020

(65) Prior Publication Data
US 2022/0312087 A1    Sep. 29, 2022

(30) Foreign Application Priority Data

Jun. 19, 2019    (JP) ................................ 2019-113509

(51) Int. Cl.
*H04Q 11/00*    (2006.01)
*H04J 14/02*    (2006.01)

(52) U.S. Cl.
CPC .......... *H04Q 11/0005* (2013.01); *H04J 14/02* (2013.01); *H04Q 11/0062* (2013.01);
(Continued)

(58) Field of Classification Search
CPC .................... H04Q 11/0005; H04J 14/0201
See application file for complete search history.

(56) References Cited

U.S. PATENT DOCUMENTS

| | | | |
|---|---|---|---|
| 6,570,685 B1 | 5/2003 | Fujita et al. | |
| 6,934,434 B1 * | 8/2005 | Kumayasu | H04Q 11/0005<br>398/104 |

(Continued)

FOREIGN PATENT DOCUMENTS

| | | |
|---|---|---|
| EP | 3334062 A1 | 6/2018 |
| JP | H11-252016 A | 9/1999 |

(Continued)

OTHER PUBLICATIONS

Extended European Search Report for EP Application No. EP20827072.8 dated Jul. 22, 2022.

(Continued)

*Primary Examiner* — Shi K Li
(74) *Attorney, Agent, or Firm* — Sughrue Mion, PLLC

(57) ABSTRACT

An optical submarine branching apparatus includes a first, second, and third switching unit. The first switching unit is connected to N first, second, and third optical fiber transmission lines connected to a first, second and third terminal stations, respectively, and switches a transmission route for a wavelength-multiplexed optical signal. The second switching unit is interposed on the N first optical fiber transmission lines between the first terminal station and the first switching unit, and switches a connection relation between in front of and behind a place where the second switching unit is interposed. The third switching unit is interposed on the N second optical fiber transmission lines between the second terminal station and the first switching unit, and switches a connection relation between in front of and behind a place where the third switching unit is interposed.

13 Claims, 13 Drawing Sheets

(52) U.S. Cl.
CPC .................. *H04Q 2011/009* (2013.01); *H04Q 2011/0016* (2013.01)

(56) References Cited

U.S. PATENT DOCUMENTS

| | | | |
|---|---|---|---|
| 2002/0044315 A1 | 4/2002 | Sugawara et al. | |
| 2009/0041457 A1* | 2/2009 | Maki | H04J 14/0204 |
| | | | 398/45 |
| 2016/0149663 A1 | 5/2016 | Ji et al. | |
| 2016/0301467 A1 | 10/2016 | Ji et al. | |
| 2016/0308639 A1 | 10/2016 | Zhang et al. | |
| 2017/0230109 A1 | 8/2017 | Kawai | |
| 2018/0070156 A1 | 3/2018 | Kawai | |
| 2018/0314010 A1* | 11/2018 | Thylen | G02B 6/124 |
| 2019/0305870 A1 | 10/2019 | Aida | |
| 2020/0033542 A1* | 1/2020 | Garrett | H04J 14/0221 |

FOREIGN PATENT DOCUMENTS

| | | |
|---|---|---|
| JP | 2002-135817 A | 5/2002 |
| JP | 2017-508331 A | 3/2017 |
| WO | 2016/017181 A1 | 2/2016 |
| WO | 2016/152115 A1 | 9/2016 |
| WO | 2018/079445 A1 | 5/2018 |

OTHER PUBLICATIONS

International Search Report for PCT Application No. PCT/JP2020/001841, dated Mar. 24, 2020.
JP Office Action for JP Application No. 2021-527339, dated May 9, 2023 with English Translation.

* cited by examiner

OPTICAL SUBMARINE BRANCHING APPARATUS, OPTICAL SUBMARINE CABLE SYSTEM, SWITCHING METHOD, AND NON-TRANSITORY COMPUTER READABLE MEDIUM

This application is a National Stage Entry of PCT/JP2020/001841 filed on Jan. 21, 2020, which claims priority from Japanese Patent Application 2019-113509 filed on Jun. 19, 2019, the contents of all of which are incorporated herein by reference, in their entirety.

TECHNICAL FIELD

The present disclosure relates to an optical submarine branching apparatus, an optical submarine cable system, a switching method, and a program.

BACKGROUND ART

In an optical submarine cable system, optical transmission apparatuses installed in land terminal stations transmit wavelength-multiplexed optical signals to each other via an optical submarine cable. An optical submarine cable system connecting a first terminal station and a second terminal station can also be configured such that an optical submarine branching apparatus is installed in the middle of an optical submarine cable and a third terminal station is connected to the optical submarine branching apparatus via an optical submarine cable. This configuration enables the first terminal station or the second terminal station to perform optical communication with the third terminal station.

Patent Literature 1 discloses an optical switch apparatus which is provided in an optical transmission apparatus of a transmission system in which a plurality of optical transmission apparatuses are connected through optical transmission lines, and performs route switching of paths set in the optical transmission lines. The optical switch apparatus disclosed in Patent Literature 1 includes 6m input ports (m is a natural number), 6m output ports, and optical branching means for branching an optical signal input from a given input port into two to four branches and outputting them from the output ports different from each other.

CITATION LIST

Patent Literature

Patent Literature 1: Japanese Unexamined Patent Application Publication No. 2002-135817

SUMMARY OF INVENTION

Technical Problem

However, in the technology disclosed in Patent Literature 1, it is impossible to switch connections of optical fiber transmission lines for wavelength-multiplexed optical signals between the first and third terminal stations after the optical submarine branching apparatus is installed, making it impossible to construct a more flexible system.

An object of the present disclosure is to provide an optical submarine branching apparatus, an optical submarine cable system, a switching method, and a program capable of solving the above-described problem. The above-described object is to make it possible to, in an optical submarine cable system including an optical submarine branching apparatus for branching to a third terminal station between first and second terminal stations, switch connections of optical fiber transmission lines between the first or second terminal station and the third terminal station after the optical submarine branching apparatus is installed.

Solution to Problem

A optical submarine branching apparatus according to a first aspect of the present disclosure includes: a first switching unit connected to N first optical fiber transmission lines connected to a first terminal station, N second optical fiber transmission lines connected to a second terminal station, and a third optical fiber transmission line connected to a third terminal station, where N is an integer equal to or greater than two, the first switching unit being configured to switch a transmission route for a wavelength-multiplexed optical signal; a second switching unit interposed on the N first optical fiber transmission lines between the first terminal station and the first switching unit, the second switching unit being configured to switch a connection relation between in front of and behind a place where the second switching unit is interposed; a third switching unit interposed on the N second optical fiber transmission lines between the second terminal station and the first switching unit, the third switching unit being configured to switch a connection relation between in front of and behind a place where the third switching unit is interposed; and a control unit configured to control switching in the first, second and third switching units.

A optical submarine cable system according to a second aspect of the present disclosure includes: a first terminal station; a second terminal station; a third terminal station; an optical submarine branching apparatus; N first optical fiber transmission lines connecting the optical submarine branching apparatus to the first terminal station; N second optical fiber transmission lines connecting the optical submarine branching apparatus to the second terminal station; and a third optical fiber transmission line connecting the optical submarine branching apparatus to the third terminal station, in which the optical submarine branching apparatus includes: a first switching unit connected to the N first optical fiber transmission lines connected to the first terminal station, the N second optical fiber transmission lines connected to the second terminal station, and the third optical fiber transmission line connected to the third terminal station, where N is an integer equal to or greater than two, the first switching unit being configured to switch a transmission route for a wavelength-multiplexed optical signal; a second switching unit interposed on the N first optical fiber transmission lines between the first terminal station and the first switching unit, the second switching unit being configured to switch a connection relation between in front of and behind a place where the second switching unit is interposed; a third switching unit interposed on the N second optical fiber transmission lines between the second terminal station and the first switching unit, the third switching unit being configured to switch a connection relation between in front of and behind a place where the third switching unit is interposed; and a control unit configured to control switching in the first, second and third switching units.

A switching method according to a third aspect of the present disclosure includes: a first control step of controlling a first switching unit disposed inside an optical submarine branching apparatus and connected to N first optical fiber transmission lines connecting the optical submarine branching apparatus to a first terminal station, N second optical fiber transmission lines connecting the optical submarine branching apparatus to a second terminal station, and a third optical fiber transmission line connecting the optical submarine branching apparatus to a third terminal station, and thereby switching a transmission route for a wavelength-multiplexed optical signal, where N is an integer equal to or greater than two; a second control step of controlling a second switching unit, and thereby switching a connection relation between in front of and behind a place where the second switching unit is interposed, the second switching unit being interposed on the N first optical fiber transmission lines between the first terminal station and the first switching unit, and being disposed inside the optical submarine branching apparatus; and a third control step of controlling a third switching unit, and thereby switching a connection relation between in front of and behind a place where the third switching unit is interposed, the third switching unit being interposed on the N second optical fiber transmission lines between the second terminal station and the first switching unit, and being disposed inside the optical submarine branching apparatus.

A program according to a fourth aspect of the present disclosure causes a control computer provided in an optical submarine branching apparatus to perform: a first control step of controlling a first switching unit disposed inside the optical submarine branching apparatus and connected to N first optical fiber transmission lines connecting the optical submarine branching apparatus to a first terminal station, N second optical fiber transmission lines connecting the optical submarine branching apparatus to a second terminal station, and a third optical fiber transmission line connecting the optical submarine branching apparatus to a third terminal station, and thereby switching a transmission route for a wavelength-multiplexed optical signal, where N is an integer equal to or greater than two; a second control step of controlling a second switching unit, and thereby switching a connection relation between in front of and behind a place where the second switching unit is interposed, the second switching unit being interposed on the N first optical fiber transmission lines between the first terminal station and the first switching unit, and being disposed inside the optical submarine branching apparatus; and a third control step of controlling a third switching unit, and thereby switching a connection relation between in front of and behind a place where the third switching unit is interposed, the third switching unit being interposed on the N second optical fiber transmission lines between the second terminal station and the first switching unit, and being disposed inside the optical submarine branching apparatus.

Advantageous Effects of Invention

According to the present disclosure, it is possible to provide an optical submarine branching apparatus, an optical submarine cable system, a switching method, and a program capable of solving the above-described problem. That is, according to the present disclosure, it is possible to, in an optical submarine cable system including an optical submarine branching apparatus for branching to a third terminal station between first and second terminal stations, switch connections of optical fiber transmission lines between the first or second terminal station and the third terminal station after the optical submarine branching apparatus is installed.

DESCRIPTION OF EMBODIMENTS

Example embodiments will be described with reference to the drawings hereinbelow. Note that, in the example embodiments, the same signs are assigned to the same or equivalent elements and overlapping description thereof will sometimes be omitted. Although the drawings to be described hereinbelow include drawings in which unidirectional arrows are drawn, each of the arrows simply illustrates a direction of a flow of a signal (data) and does not rule out bidirectionality.

First Example Embodiment

Figure 1:
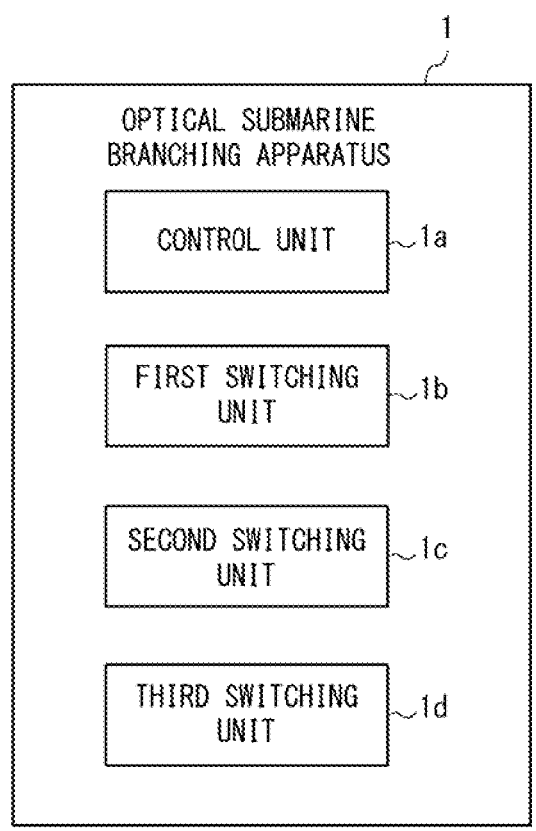
FIG. 1 is a block diagram illustrating a configuration example of an optical submarine branching apparatus according to a first example embodiment.

An optical submarine branching apparatus according to a first example embodiment and an optical submarine cable system including the optical submarine branching apparatus will be described referring to FIGS. 1 and 2. FIG. 1 is a block diagram illustrating a configuration example of the optical submarine branching apparatus according to the first example embodiment, and FIG. 2 is a schematic diagram illustrating a configuration example of the optical submarine cable system including the optical submarine branching apparatus.

As illustrated in FIG. 1, the optical submarine branching apparatus 1 according to present example embodiment includes a control unit 1a, a first switching unit 1b, a second switching unit 1c, and a third switching unit 1d, and can be used to branch optical communication performed between terminal stations to another terminal station (a branch terminal station). That is, the optical submarine branching apparatus 1 can be used to distribute light to a branch terminal station side. Each of the components of the optical submarine branching apparatus 1 will be described later.

Figure 2:
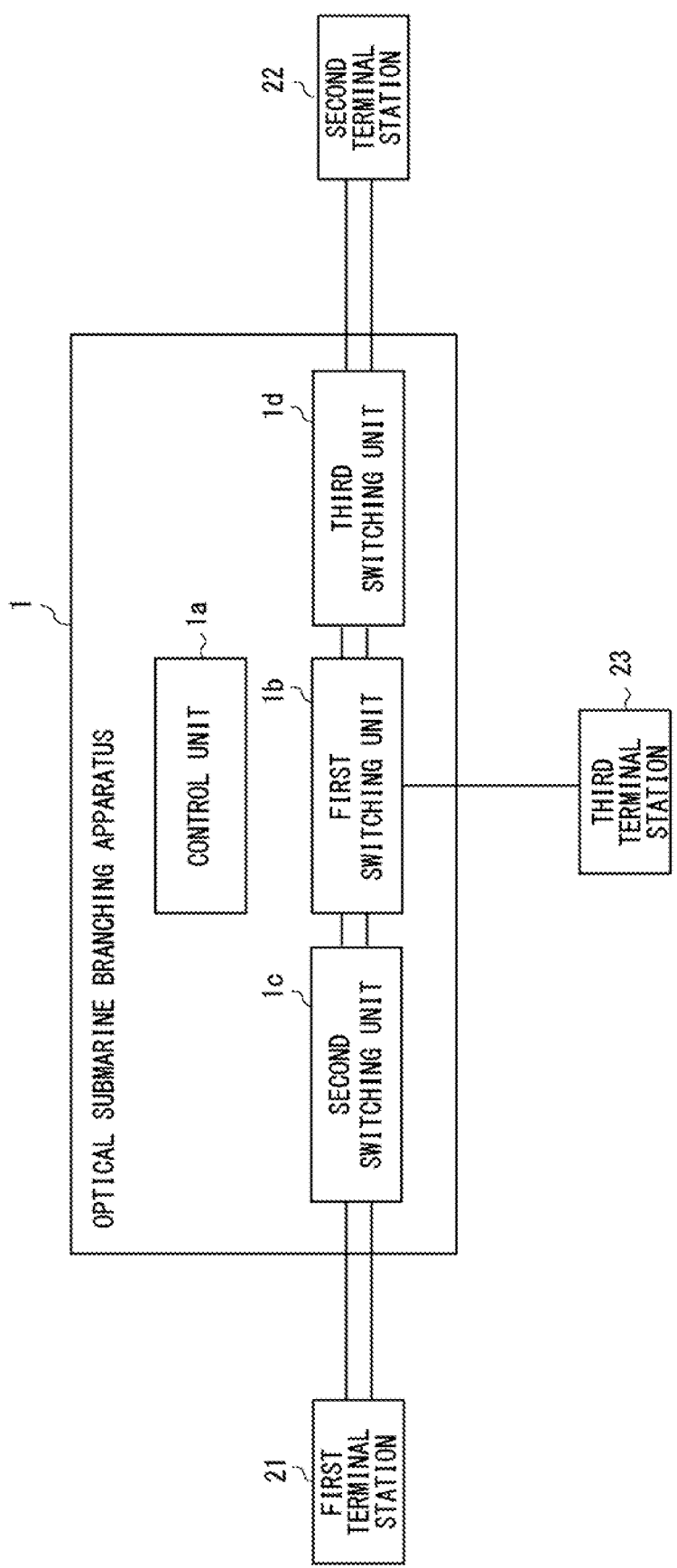
FIG. 2 is a schematic diagram illustrating a configuration example of an optical submarine cable system including the optical submarine branching apparatus in FIG. 1.

As illustrated in FIG. 2, the optical submarine branching apparatus 1 according to the present example embodiment can be connected to a first terminal station 21 via N optical fiber transmission lines (hereinafter, referred to as first optical fiber transmission lines) and connected to a second terminal station 22 via N optical fiber transmission lines (hereinafter, referred to as second optical fiber transmission lines). Note that N is an integer equal to or greater than two. Further, the optical submarine branching apparatus 1 can be connected to a third terminal station 23 via an optical fiber transmission line (hereinafter referred to as a third optical fiber transmission line).

The optical submarine branching apparatus 1, the first terminal station 21, the second terminal station 22, the third terminal station 23, and the optical fiber transmission lines connecting the apparatus and the terminal stations constitute the optical submarine cable system (hereinafter, referred to as this system) in the present example embodiment. Note that each terminal station can be installed on land and optical fiber transmission lines between each terminal station and the optical submarine branching apparatus 1 can be contained in a single optical cable and laid on the sea floor. For example, the first optical fiber transmission lines between the first terminal station 21 and the optical submarine branching apparatus 1 can be contained in a single optical cable and laid on the sea floor. The same applied to the second optical fiber transmission lines connected to the second terminal station 22 and the third optical fiber transmission line connected to the third terminal station 23. Note, however, that the N first optical fiber transmission lines can be divided into sets and contained in a plurality of optical cables, and the N second optical fiber transmission lines can also be divided into sets and contained in a plurality of optical cables.

This system is an optical network system performing optical communication between terminal stations, and a wavelength division multiplexing, WDM, transmission method is employed for the optical communication. In other words, this system is a wavelength multiplexing optical transmission system in which a WDM transmission network performing single-fiber bidirectional communication is included. For example, installing an optical transmission apparatus including a multiplexer/demultiplexer or the like at each terminal station enables wavelength multiplexing communication between terminal stations via an optical fiber transmission line to be performed.

Respective constituent elements of the optical submarine branching apparatus 1 will be described.

The control unit 1a controls switching in the first switching unit 1b, the second switching unit 1c, and the third switching unit 1d. The control unit 1a can be configured as a part that performs control of the entire optical submarine branching apparatus 1 including the above-described switching control. The control unit 1a is capable of performing the switching control in accordance with, for example, a control signal acquired from an optical fiber transmission line. Extracting an optical signal of a specific wavelength among wavelength-multiplexed signals from an optical fiber transmission line and converting the optical signal to an electrical signal enables such a control signal to be acquired.

The control unit 1a can be achieved by, for example, a central processing unit (CPU), a working memory, and a non-transitory storage device storing a program for controlling the entire optical submarine branching apparatus 1. In other words, the control unit 1a can include a control computer in which the program is incorporated in an executable manner. The control unit 1a can also be achieved using, for example, an integrated circuit.

The first switching unit 1b is connected to N first optical fiber transmission lines connected to the first terminal station 21, N second optical fiber transmission lines connected to the second terminal station 22, and third optical fiber transmission line connected to the third terminal station 23, and switches a transmission route for a wavelength-multiplexed optical signal. As described above, the first switching unit 1b is configured to be able to switch a connection state in the transmission route in accordance with control from the control unit 1a.

The second switching unit 1c is interposed on the N first optical fiber transmission lines between the first terminal station 21 and the first switching unit 1b, and switches a connection relation (an input/output relation) between in front of and behind a place where the second switching unit 1c is interposed. The second switching unit 1c switches the transmission route by the above-described switching of the connection relation.

The third switching unit 1d is interposed on the N second optical fiber transmission lines between the second terminal station 22 and the first switching unit 1b, and switches a connection relation (an input/output relation) between in front of and behind a place where the third switching unit 1d is interposed. The third switching unit 1d switches the transmission route by the above-described switching of the connection relation. Each of the second switching unit 1c and the third switching unit 1d can be formed, for example, by an N×N optical switch. Note that the first switching unit 1b, the second switching unit 1c, and the third switching unit 1d can also be referred to as a main switching unit, a first sub-switching unit, and a second sub-switching unit, respectively.

As described above, present example embodiment can provide an advantageous effect that the connection of an optical fiber transmission line between the first terminal station 21 and the third terminal station 23 can be switched after the optical submarine branching apparatus 1 is installed. Similarly, present example embodiment can provide an advantageous effect that the connection of an optical fiber transmission line between the second terminal station 22 and the third terminal station 23 can be switched after the optical submarine branching apparatus 1 is installed. Regarding these advantageous effects, the latter or former advantageous effects can be achieved even when the optical submarine branching apparatus 1 does not include the second switching unit 1c or the third switching unit 1d, respectively.

Further, although not illustrated in the drawings, each of the part corresponding to the first switching unit 1b (i.e., the main body unit), the part corresponding to the second switching unit 1c, and the part corresponding to the third switching unit 1d can be formed with a separate housing.

Further, in such a case, a control unit can be provided in each of the parts. Further, the part corresponding to the second switching unit 1c can also be provided in other submarine apparatuses such as a repeating apparatus interposed between the first terminal station 21 and the main body unit. Similarly, the part corresponding to the third switching unit 1d can also be provided in other submarine apparatuses such as a repeating apparatus interposed between the main body unit and the second terminal station 22. By the above-described configuration, it is possible to miniaturize the housing of each unit, such as the main body unit, that constitutes the optical submarine branching apparatus and, in particular, facilitate winding work of optical cables at the time of laying and retrieval of the optical cables.

A switching method in the optical submarine branching apparatus 1 will be complemented below. The optical submarine branching apparatus 1 is capable of performing a switching method including the following first to third control steps, as described in the switching processing thereof. In the first control step, the optical submarine branching apparatus 1 controls the first switching unit 1b, which is connected to the N first optical fiber transmission lines, the N second optical fiber transmission lines, and the third optical fiber transmission line, and is disposed inside the optical submarine branching apparatus 1, and thereby switches transmission route for wavelength-multiplexed optical signals. In the second control step, the optical submarine branching apparatus 1 controls the second switching unit 1c, which is interposed on the N first optical fiber transmission lines between the first terminal station 21 and the first switching unit 1b, and is disposed inside the optical submarine branching apparatus 1, and thereby switches a connection relation between in front of and behind a place where the second switching unit 1c is interposed. In the third control step, the optical submarine branching apparatus 1 controls the third switching unit 1d, which is interposed on the N second optical fiber transmission lines between the second terminal station 22 and the first switching unit 1b, and is disposed inside the optical submarine branching apparatus 1, and thereby switches a connection relation between in front of and behind a place where the third switching unit 1d is interposed. The other examples are as described above, and examples that will be described in example embodiments to be described later can also be applied.

A program that can be incorporated in the optical submarine branching apparatus 1 will be complemented below. The program incorporated in the above-described control unit 1a serves as a program causing a control computer included in the optical submarine branching apparatus 1 to perform the above-described first to third control steps. The other examples are as described above, and examples that will be described in example embodiments to be described later can also be applied.

Second Example Embodiment

Figure 3:
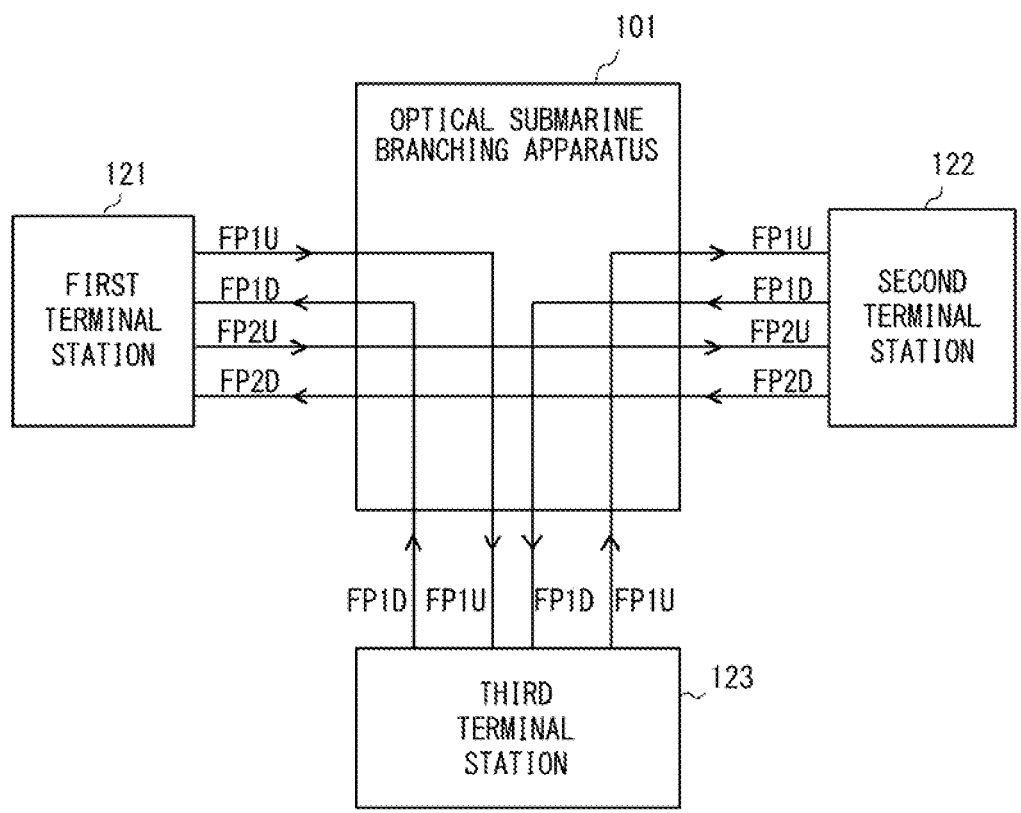
FIG. 3 is a diagram illustrating an optical submarine cable system including an optical submarine branching apparatus according to a comparative example.
Figure 4:
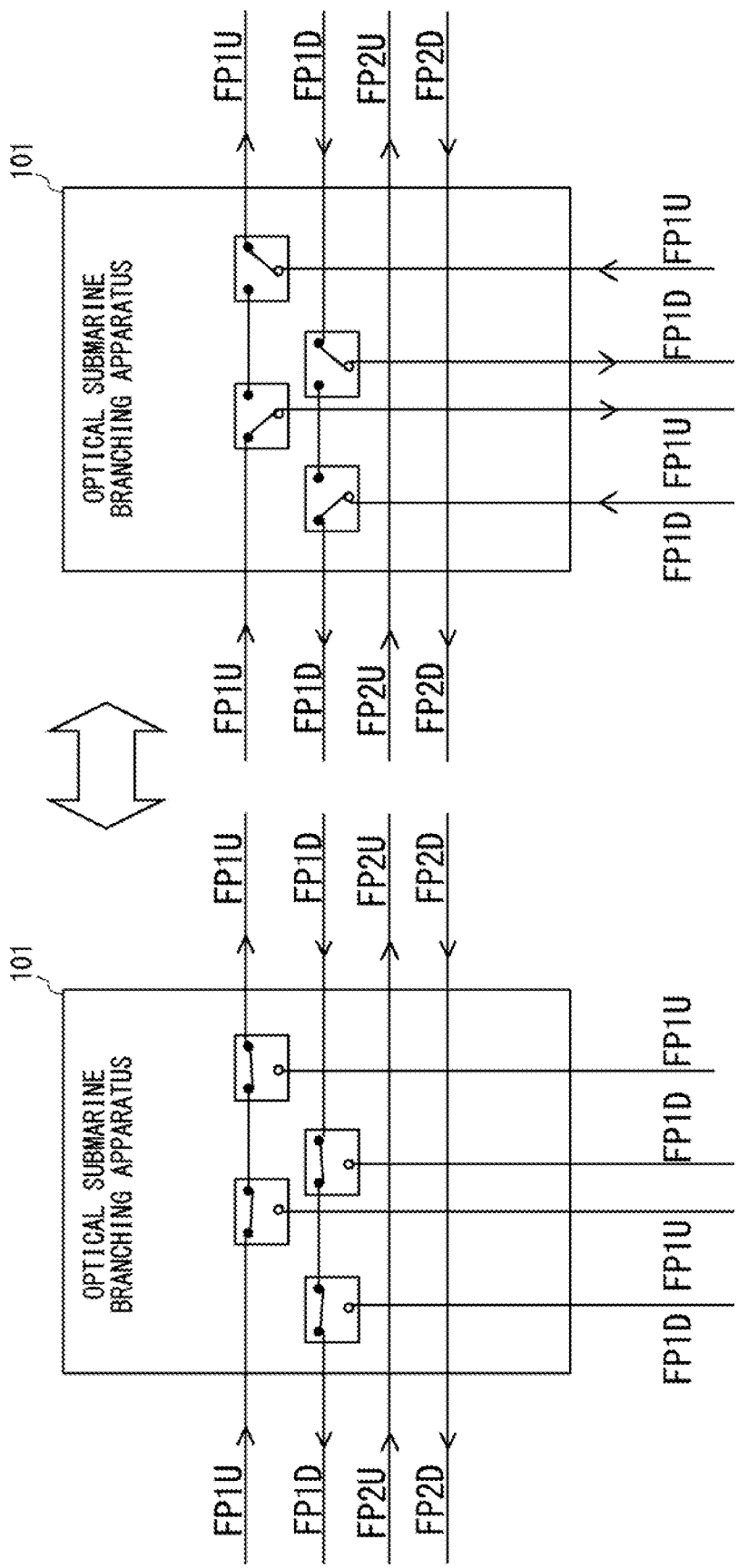
FIG. 4 is a diagram for explaining a switching operation of optical transmission routes in the optical submarine branching apparatus of the optical submarine cable system illustrated in FIG. 3.

Although a second example embodiment will be described with additional reference to FIGS. 3 to 11, focusing on differences from the first example embodiment, various examples described in the first example embodiment are applicable. Firstly, a comparative example will be described with reference to FIGS. 3 and 4. FIG. 3 is a diagram illustrating an optical submarine cable system including an optical submarine branching apparatus according to the comparative example, and FIG. 4 is a diagram for explaining switching of an optical transmission route in the optical submarine branching apparatus of the optical submarine cable system illustrated in FIG. 3.

As illustrated in FIG. 3, the optical submarine branching apparatus 101 according to the comparative example makes it possible to perform communication with a plurality of terminal station apparatuses through an optical submarine cable by transmitting signals between a first terminal station (trunk station) 121 and a third terminal station (branch station) 123. Specifically, optical switches provided inside the optical submarine branching apparatus 101 are switched as illustrated in FIG. 4. In this way, it is possible to switch the state of optical transmission routes from a state in which they are connected between the first terminal station (trunk station) 121 and the second terminal station (trunk station) 122 to a state in which they are connected between the first terminal station (trunk station) 121 and the third terminal station (branch station) 123.

Note that a fiber pair connecting the first terminal station 121 with the second terminal station 122 can be formed (or regarded) as single trunk line, and a fiber pair connecting the optical submarine branching apparatus 101 with the third terminal station 123 can be formed (or regarded) as a branch line. That is, the system can include two trunk lines and one branch line, and this feature also applies to systems according to other example embodiments described later. Note that, although a distinction between a trunk line and a branch line is generally made based on a power supply system and line length, distinction criteria are not limited thereto.

The optical submarine branching apparatus 101 according to the comparative example has such a configuration that routes between optical fiber transmission lines (fiber pairs in this example) of different trunks cannot be changed after the optical submarine branching apparatus 101 is installed. Note that the fiber pair will be described later. In the optical submarine branching apparatus 101 according to the comparative example, for each of the fiber pairs, the destination of the connection of that fiber pair is determined when the optical submarine branching apparatus 101 is installed, so that it is impossible to change the destinations of the connections of fiber pairs of different trunks during the operation. For example, after the installation, it is impossible to Add/Drop an optical fiber for the second upstream FP2U to the branch side like the optical fibers for the first upstream FP1U.

Recently, however, there has been a growing demand that fiber pars of different trunks should be able to be interchanged after the installation, so that a more flexible system configuration should be able to be constructed. So, it has been desired to satisfy these demands. To this end, the optical submarine branching apparatus according to present example embodiment makes it possible to interchange optical fiber transmission lines during its operation by using an optical switch having N input ports and N output ports as illustrated in the optical submarine branching apparatus 1 according to the first example embodiment. Such an interchange can be carried out, for example, by transmitting a control signal (a signal indicating a switching command) from the outside. Details of present example embodiment will be described hereinafter.

Figure 5:
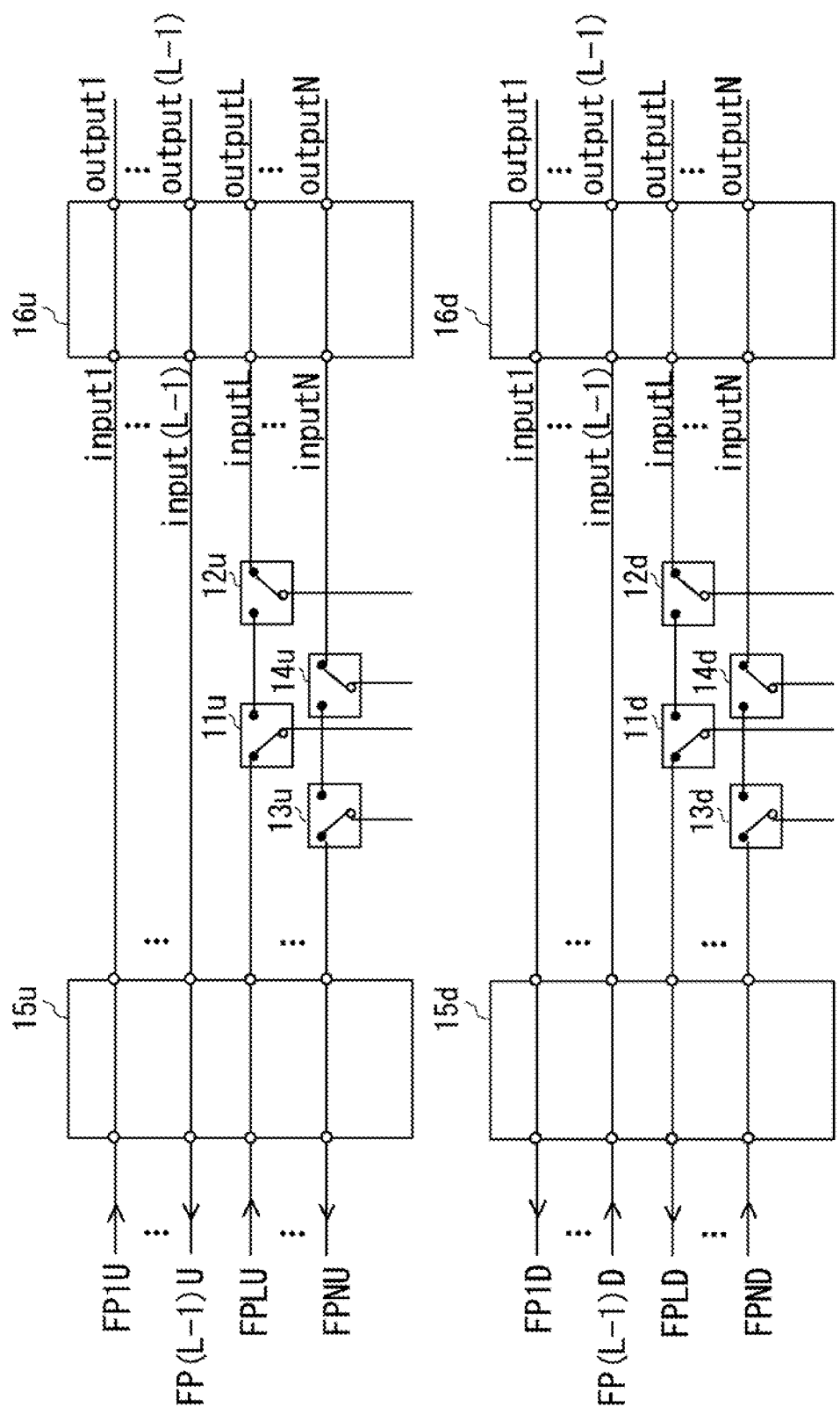
FIG. 5 is a diagram illustrating a configuration example of an optical submarine branching apparatus according to a second example embodiment.
Figure 6:
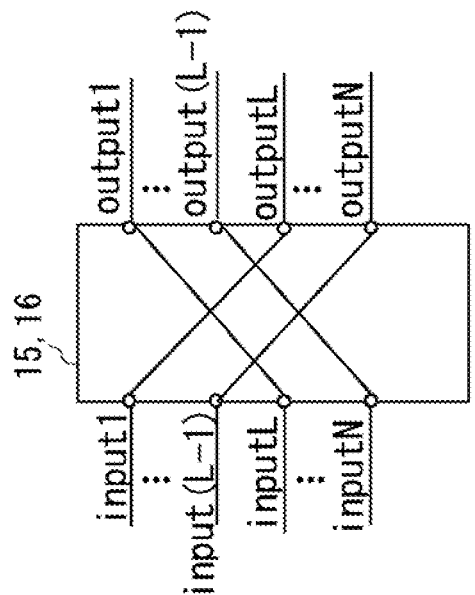
FIG. 6 is a diagram for explaining a switching operation of optical transmission routes in an N×N optical switch of the optical submarine branching apparatus illustrated in FIG. 5.
Figure 6:
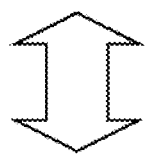
Figure 6:
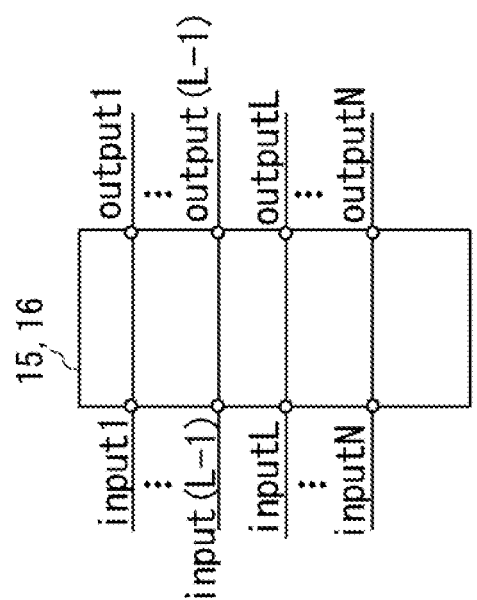
Figure 7:
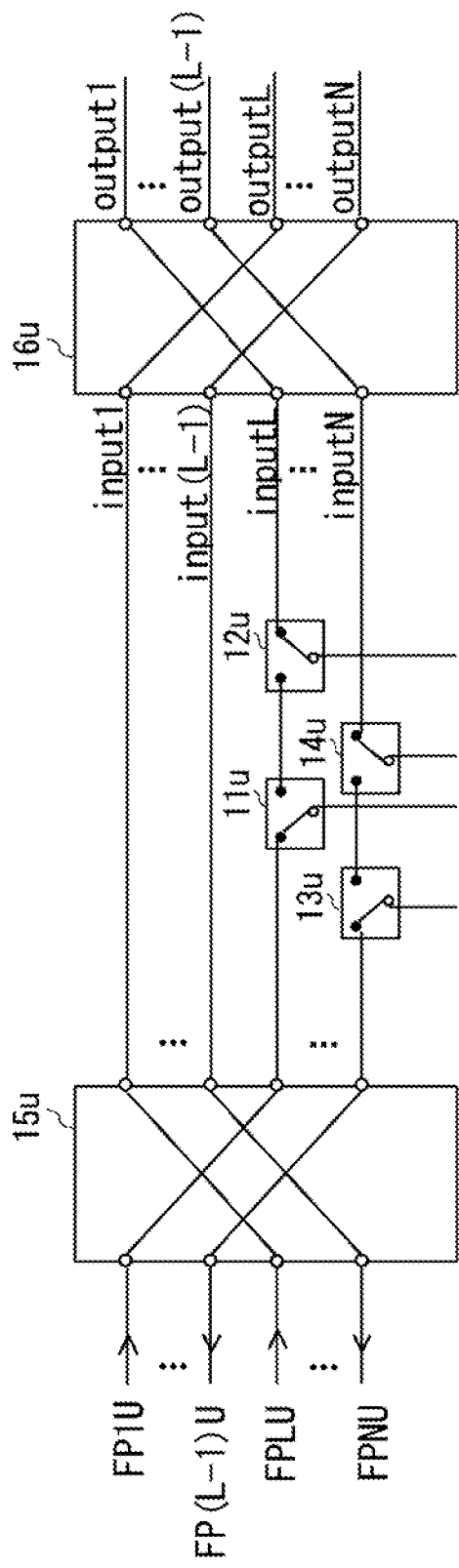
FIG. 7 is a diagram illustrating an example of optical transmission routes when the N×N optical switch in the optical submarine branching apparatus illustrated in FIG. 5 is in an On-state.

Firstly, an example of a configuration of the optical submarine branching apparatus according to present example embodiment will be described with reference to FIGS. 5 to 7. FIG. 5 is a diagram illustrating a configuration example of the optical submarine branching apparatus according to present example embodiment. FIG. 6 is a diagram for explaining a switching operation of optical transmission routes in an N×N optical switch of the optical submarine branching apparatus illustrated in FIG. 5. FIG. 7 is a diagram illustrating an example of optical transmission routes when the N×N optical switch of the optical submarine branching apparatus illustrated in FIG. 5 is in an On-state.

As illustrated in FIG. 5, fiber pairs are adopted in present example embodiment. That is, each optical fiber transmission line in the N first optical fiber transmission lines, the N second optical fiber transmission lines, and the third optical fiber transmission line has (i.e., is composed of) a fiber pair. This fiber pair is composed of an optical fiber for optically transmitting information from the first terminal station 21 side (hereinafter referred to as an "upstream fiber") and an optical fiber for optically transmitting information to the first terminal station 21 side (hereinafter referred to as a "downstream fiber"). As described above, the fiber pair can be composed of a pair of an optical fiber for upstream and an optical fiber for downstream. For the sake of convenience, the following description is given on the assumption that information is uploaded from the first terminal station 21 side to the second terminal station 22, or to the second terminal station 22 through the third terminal station 23, and this direction is defined as an upstream direction.

In the example illustrated in FIG. 5, each of the N first optical fiber transmission lines and the N second optical fiber transmission lines include N upstream fibers and N downstream fibers, and the M third optical fiber transmission lines is included. The M third optical fiber transmission lines include M upstream fibers and M downstream fibers. Note that M is a positive integer equal to or less than N, and L in FIG. 5 satisfies a relation L=N−M. In FIG. 5, a fiber pair composed of an optical fiber for a Lth upstream signal FPLU (an Lth upstream fiber) and an optical fiber for an Lth downstream signal FPLD (an Lth downstream fiber) is used as a first optical fiber transmission line and a second optical fiber transmission line.

As illustrated in FIG. 5, the optical submarine branching apparatus 10 according to present example embodiment includes N×N optical switches 15u and 15d, which correspond to the example of the second switching unit 1c illustrated in FIG. 2, and N×N optical switches 16u and 16d, which correspond to the example of the third switching unit 1d. Since an example in which one optical fiber transmission line is formed by a fiber pair is illustrated in FIG. 5, the optical switch for N optical fiber transmission lines can be formed by two N×N optical switches as shown above. N can be any integer equal to or greater than two. That is, an N×N optical switch is an optical switch in which there are an arbitrary number (N) of ports as each of input ports and output ports, where N is equal to or greater than two.

Note that, as illustrated in FIG. 5, the second switching unit 1c can be disposed in such a manner that its area is divided for the N×N optical switch 15u for upstream fibers and the N×N optical switch 15d for downstream fibers. Similarly, the third switching unit 1d can be disposed in such a manner that its area is divided for the N×N optical switch 16u for upstream fibers and the N×N optical switch 16d for downstream fibers.

Further, the optical submarine branching apparatus 10 also includes a first switching unit (also referred to as a first switching unit 1b in this example) corresponding to the first switching unit 1b illustrated in FIG. 2. The first switching unit 1b can have a function of connecting each of the N first optical fiber transmission lines to a respective one of the N second optical fiber transmission lines (hereinafter referred to as a function F). Further, the first switching unit 1b can have a function of switching any one of the M first optical fiber transmission lines connected to the second switching unit 1c so as to be connected to the third optical fiber transmission line.

Because of these functions, the first switching unit 1b can include M first optical switches each of which has one input path and two output paths. Further, each of the M first optical switches is connected to a respective one of the M first optical fiber transmission lines. That is, the optical submarine branching apparatus 10 can include 1×2 optical switches 11u, 12u, 13u, 14u, 11d, 12d, 13d and 14d, which correspond to an example of a part of the first switching unit 1b. The 1×2 optical switches 11u, 12u, 13u and 14u are optical switches for upstream fibers.

In the above description, the input and the output are only distinguished from each other for the purpose that the description is made assuming, for convenience, the first terminal station 21 side as the origin of information transmission, and the following description will also appropriately be made based on the origin of information transmission. Note that each of the optical switches provided in the first switching unit 1b may be an optical switch having other configurations, such as an optical switch having two input paths and two output paths. Further, optical switches having different configurations may be used in the first switching unit 1b in a mixed manner. Further, the first switching unit 1b can also have a multi-stage configuration in which optical switches are arranged differently from those shown in the above-described example.

Further, the first switching unit 1b can also have a function of switching any one of the M second optical fiber transmission lines connected to the third switching unit 1d so as to be connected to the third optical fiber transmission line.

Because of this function and the above-described function F, the first switching unit 1b can include M second optical switches each of which has one input path and two output paths. Further, each of the M second optical switches is connected to a respective one of the M second optical fiber transmission lines. That is, the optical submarine branching apparatus 10 can include 1×2 optical switches 11d, 12d, 13d and 14d, which correspond to an example of a part of the first switching unit 1b. The 1×2 optical switches 11d, 12d, 13d, and 14d are optical switches for downstream fibers.

The connection relation of the above-described 1×2 optical switch 11u and the like is one illustrated in the drawings. For example, the input port of the 1×2 optical switch 11u is connected to an Lth output port of the N×N optical switch 15u, which corresponds to an optical fiber for an Lth upstream signal FPLU (an Lth upstream fiber). One of the output ports of the 1×2 optical switch 11u is connected to the input port of the 1×2 optical switch 12u, and the other output port is connected to one of the third optical fiber transmission lines. One of the output ports of the 1×2 optical switch 12u is connected to an Lth input port of the N×N optical switch 16u, and the other output port is connected to one of the third optical fiber transmission lines.

Further, the input port of the 1×2 optical switch 13u is connected to an Nth output port of the N×N optical switch 15u, which corresponds to an optical fiber for an Nth upstream signal FPNU (an Nth upstream fiber). One of the output ports of the 1×2 optical switch 13u is connected to the input port of the 1×2 optical switch 14u, and the other output port is connected to one of the third optical fiber transmission lines. One of the output ports of the 1×2 optical switch 14u is connected to an Nth input port of the N×N optical switch 16u, and the other output port is connected to one of the third optical fiber transmission lines. Note that the connection relation of each of the 1×2 optical switches corresponding to the Lth to Nth upstream fibers is similar to the above-described connection relation, and the same applies to those for the downstream. Note that, In FIG. 6, the N×N optical switches 15*u* and 15*d* are referred to as N×N optical switches 15 without differentiating them from each other, and the N×N optical switches 16*u* and 16*d* are referred to as N×N optical switches 16 without differentiating them from each other.

By the above-described configuration, in the N×N optical switches 15 and 16, when they are in an Off-state as illustrated on the left side of FIG. 6, light input from each input (input port) travels straight to its corresponding output (output port). On the other hand, when the N×N optical switches 15 and 16 are in an On-state as illustrated on the right side of FIG. 6, it is possible to make light input from each input output to an arbitrary output (designated by a control signal). In this way, as illustrated in FIG. 7, it is possible to freely recombine the fiber pairs of the first and second terminal stations 21 and 22 that are connected to the third terminal station 23 side.

As explained above, in each of the N×N optical switches 15 and 16, an optical transmission route can be changed inside thereof. Therefore, in the optical submarine branching apparatus 10, it is possible to changes routes between different fiber pairs of the first terminal station 21 or the second terminal station 22 even after the optical submarine branching apparatus 10 is installed, i.e., even during the operation (in operation). For example, it is possible to freely recombine fiber pairs on the branch station (the third terminal station 23) side of the optical submarine cable, which connects the apparatuses of the terminal stations with each other, and those on the trunk station (the first or second terminal station 21 or 22) side thereof. Further, it is possible to reduce the number of optical switches provided in the optical submarine branching apparatus 10 by forming optical transmission routes using N×N optical switches.

Further, the optical submarine branching apparatus 10 includes, in addition to the optical switch driving circuit having the configuration illustrated in the drawings, a control unit (not illustrated) for controlling the optical switch driving circuit, which corresponds to the control unit 1*a*. The switching control by this control unit can be performed based on a control signal that can be extracted from a wavelength-multiplexed optical signal. In particular, this wavelength-multiplexed optical signal is preferably a signal that is optically transmitted through at least two of the optical fiber transmission lines in each of the N first optical fiber transmission lines, the N second optical fiber transmission lines, and the third optical fiber transmission lines.

By providing the optical submarine branching apparatus 10 with an extraction unit (not illustrated) that extracts a control signal from an optical signal received through an optical fiber transmission line, the optical submarine branching apparatus 10 can extract a control signal. The extraction unit may be installed with respect to each optical fiber and may also be installed on the input side from a branch station. When a plurality of extraction units are installed, a plurality of control units may be installed in correspondence to the respective extraction units. The extraction unit extracts a control signal from an optical signal (including a main signal and a control signal) that is input via the optical fiber transmission line. The extraction unit may be constituted by, for example, a combination of an optical coupler (branching coupler) and an optical filter extracting a control signal. When the control signal uses a wavelength different from that of the main signal, the optical filter can be a filter selectively transmitting the wavelength, and, when the control signal is a signal generated by superimposing a low frequency component on a main signal, the optical filter can be a low-pass filter. In particular, it can be said that the above-described control signal is preferably a signal extractable from wavelength-multiplexed optical signals optically transmitted through at least two or more optical fiber transmission lines out of such optical fiber transmission lines, in terms of providing the control signal with redundancy.

Note, however, that the control unit can be configured to control switching of each of the switching units 11*b* to 11*d*, based on a control signal received from another route (a route different from the data communication route) as an electrical signal or an optical signal. Note that the control unit can also be configured so as to control switching by the first switching unit 1*b* according to a change in the external power supply of the optical submarine branching apparatus 10. In this case, the optical submarine branching apparatus 10 is configured to include a detection unit configured to detect whether or not external power is supplied from each terminal station. When, for example, it is detected that external power supply between trunk stations is interrupted, the control unit can control the first switching unit 1*b* to drop a trunk line to a branch line.

In particular, the optical submarine branching apparatus 10 preferably has a function of switching the second switching unit 1*c* and the third switching unit 1*d* in an interlocked manner while maintaining the switching state by the first switching unit 1*b*. Such control can also be performed by the control unit. By this function, even after the optical submarine branching apparatus 10 is installed, it is possible to arbitrarily change information to be transmitted between the respective fiber pairs while maintaining the state in which the first terminal station 21 is connected to the third terminal station 23, and the second terminal station 22 is connected to the third terminal station. Note that in the case of the interlocking switching, it is possible to prevent information from being incorrectly mixed by switching the second switching unit 1*c* and the third switching unit 1*d* so that they form symmetrical optical transmission routes with respect to the first switching unit 1*b*.

Figure 8:
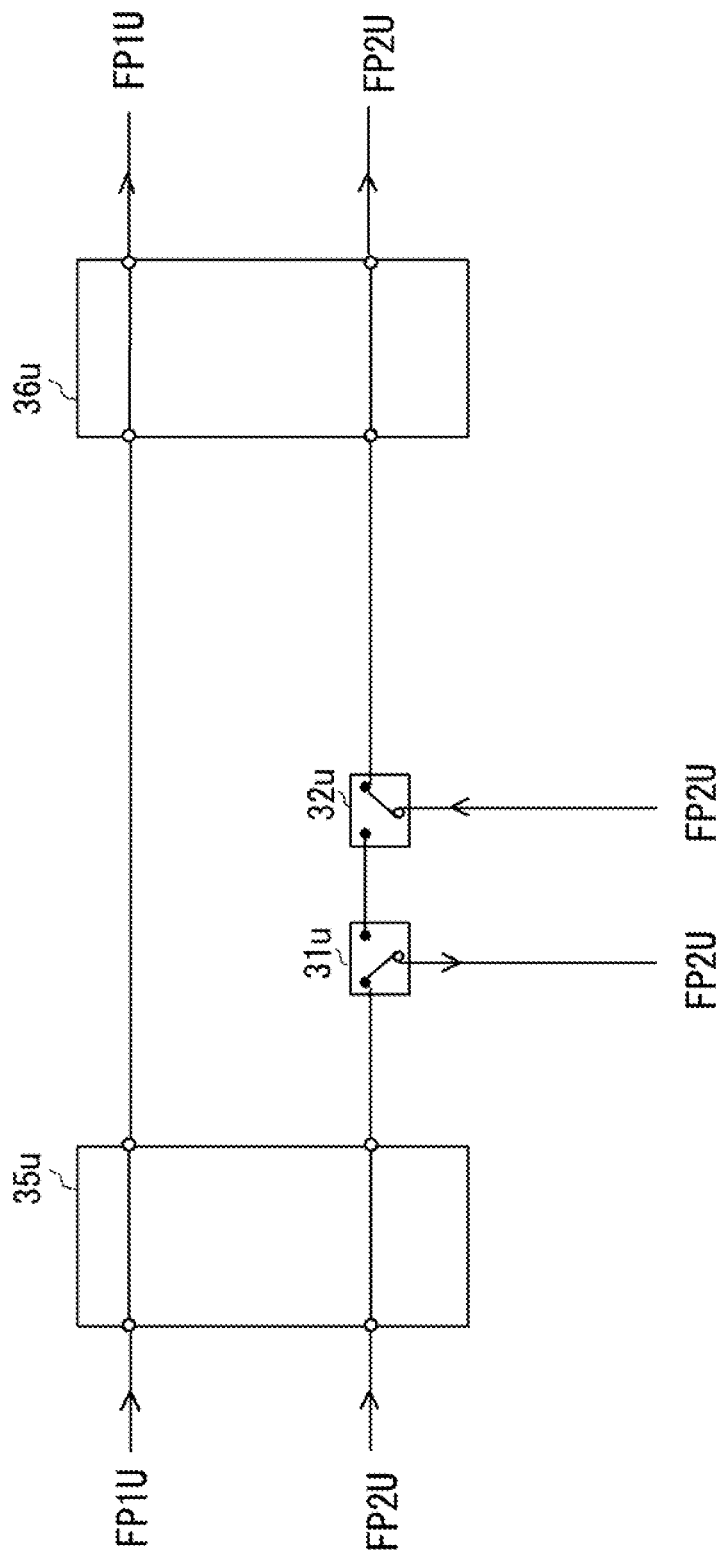
FIG. 8 is a diagram illustrating an optical transmission route when a 2×2 optical switch is in an Off-state and a 1×2 optical switch is in an On-state in another example of the configuration of the optical submarine branching apparatus according to the second example embodiment.
Figure 9:
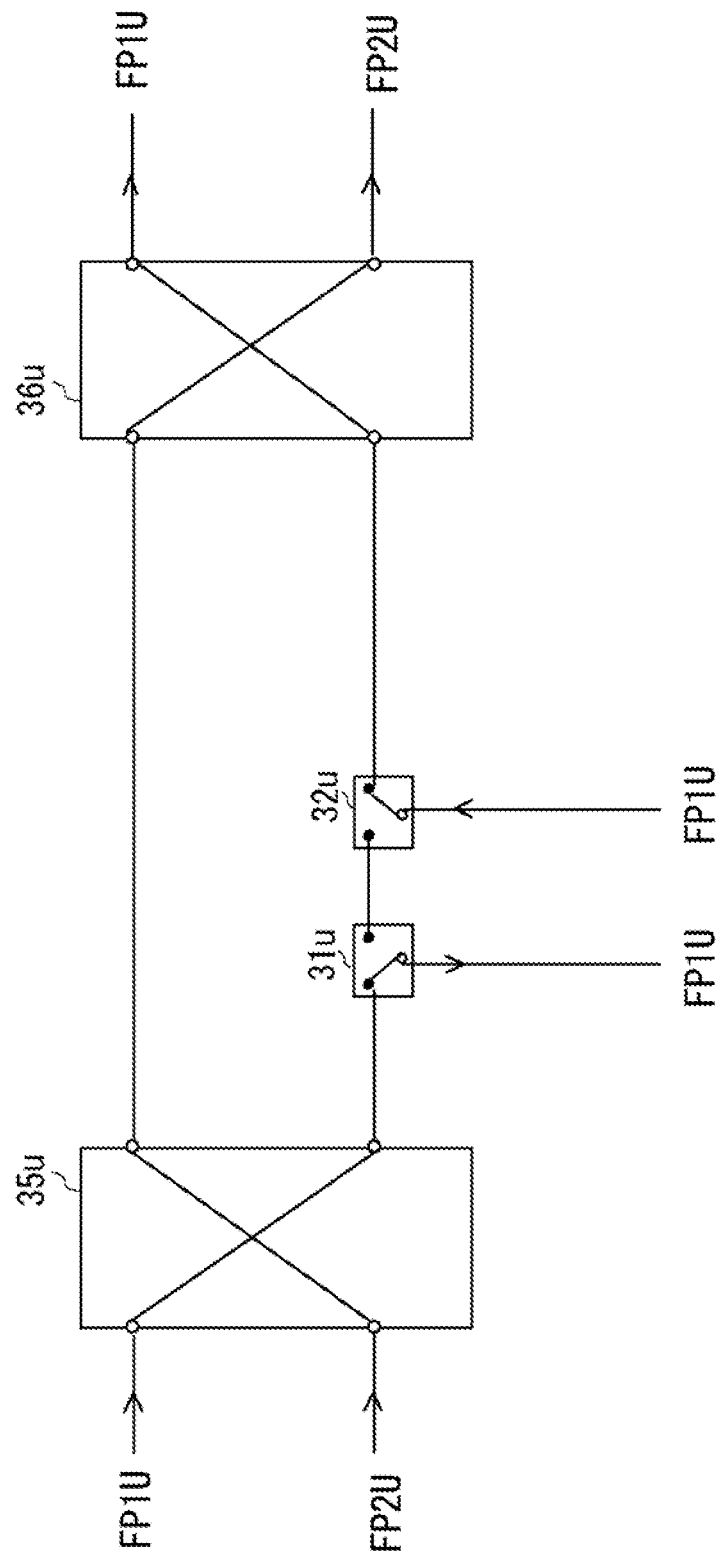
FIG. 9 is a diagram illustrating an optical transmission route when the 2×2 optical switch and the 1×2 optical switch are both in an On-state in the other example of the configuration of the optical submarine branching apparatus according to the second example embodiment.

Next, as a specific example, a case where N is two (N=2) will be described by referring to FIGS. 8 and 9 as well. FIG. 8 is a diagram illustrating an optical transmission route when a 2×2 optical switch is in an Off-state and a 1×2 optical switch is in an On-state in another example of the configuration of the optical submarine branching apparatus according to the second example embodiment. FIG. 9 is a diagram illustrating an optical transmission route when the 2×2 optical switch and the 1×2 optical switch are both in an On-state in present example of the configuration.

In the optical submarine branching apparatus illustrated in FIG. 8, as an optical switch driving circuit, an N×N optical switch 35*u* is connected to the first terminal station 21 side of the 1×2 optical switch 31*u*, and an N×N optical switch 36*u* is connected to the second terminal station 22 side of the 1×2 optical switch 32*u*. Further, the 1×2 optical switch 31*u* and the 1×2 optical switch 32*u* are connected to each other. As illustrated in FIG. 8, when the 1×2 optical switches 31*u* and 32*u* are in an On-state and the 2×2 optical switches 35*u* and 36*u* are in an Off-state, a signal on the FP1U side travels straight through the 2×2 optical switches 35*u* and 36*u* and is output to the second terminal station 22 side. In this case, a signal on the FP2U side travels straight through the 2×2 optical switches 35*u* and 36*u*, and is output to the third terminal station 23 side through the 1×2 optical switches 31*u* and 32*u*.

On the other hand, as illustrated in FIG. 9, when the 1×2 optical switches 31u and 32u are in an On-state and the 2×2 optical switches 35u and 36u are in an On-state, a signal on the FP2U side is output to the second terminal station 22 side. Further, a signal on the FP1U side is output to the third terminal station 23 side through the 1×2 optical switches 31u and 32u. Although only the upstream of the fiber pairs has been described above, the same applies to the downstream thereof. As described above, when the 2×2 optical switches 35u and 36u are used, it is possible to interchange the fiber pair connecting the first terminal station 21 with the second terminal station 22 with the fiber pair connecting the first and second terminal stations 21 and 22 with the third terminal station 23, i.e., to interchange two different fiber pairs.

Figure 10:
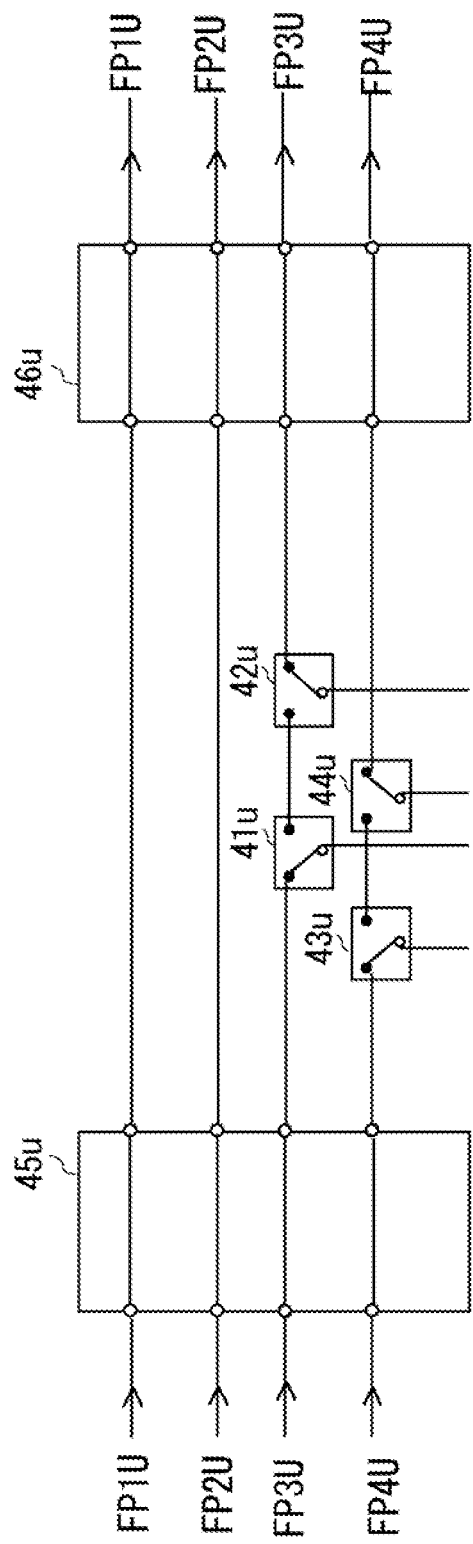
FIG. 10 is a diagram illustrating another configuration example of the optical submarine branching apparatus according to the second example embodiment.
Figure 11:
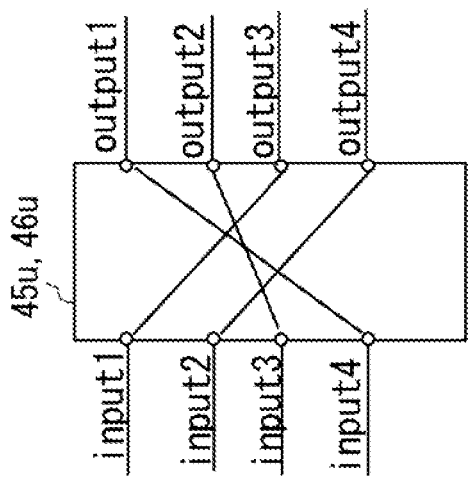
FIG. 11 is a diagram for explaining a switching operation of optical transmission routes in a 4×4 optical switch of the optical submarine branching apparatus illustrated in FIG. 10.
Figure 11:
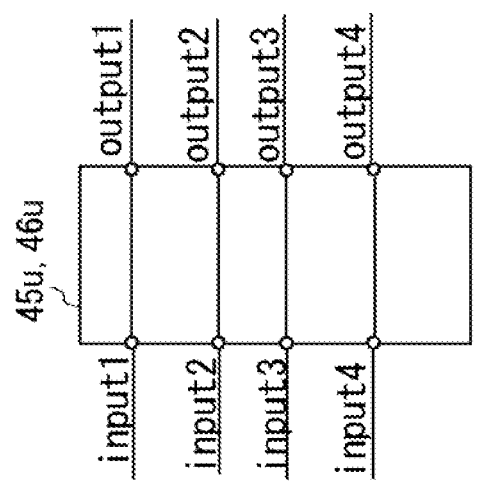

Next, a case where N is four (N=4) will be described by referring to FIGS. 10 and 11 as well. FIG. 10 is a diagram illustrating another configuration example of the optical submarine branching apparatus according to the second example embodiment. FIG. 11 is a diagram for explaining a switching operation of optical transmission routes in a 4×4 optical switch of the optical submarine branching apparatus illustrated in FIG. 10.

In the optical submarine branching apparatus illustrated in FIG. 10, as an optical switch driving circuit, an N×N optical switch 45u is connected to the first terminal station 21 side of the 1×2 optical switches 41u and 43u, and an N×N optical switch 46u is connected to the second terminal station 22 side of the 1×2 optical switches 42u and 44u. Further, the 1×2 optical switch 41u is connected to the 1×2 optical switch 42u, and the 1×2 optical switch 43u is connected to the 1×2 optical switch 44u.

When the 1×2 optical switches 41u to 44u are in an On-state and the 4×4 optical switches 45u and 46u are in an Off-state as illustrated on the left side of FIG. 11, signals on the FP1U and FP2U side travel straight through the 2×2 optical switches 45u and 46u and are output to the second terminal station 22 side. In this case, signals on the FP3U and FP4U side travel straight through the 2×2 optical switches 45u and 46u, and are then output to the third terminal station 23 through the 1×2 optical switches 41u and 42u and the 1×2 optical switches 43u and 44u, respectively.

On the other hand, when the 1×2 optical switches 41u to 44u are in an On-state and the 4×4 optical switches 45u and 46u are in an On-state as illustrated on the right side of FIG. 11, signals on the FP3U and FP4U side are output to the second terminal station 22 side. Further, signals on the FP1U and FP2U side are both output to the third terminal station 23 side through the 1×2 optical switches 41u and 42u and the 1×2 optical switches 43u and 44u, respectively. Although only the upstream of the fiber pairs has been described above, the same applies to the downstream thereof.

As described above, when the 4×4 optical switches 45u and 46u are used, it is possible to interchange the fiber pair connecting the first terminal station 21 with the second terminal station 22 with the fiber pair connecting the first and second terminal stations 21 and 22 with the third terminal station 23, i.e., to interchange four different fiber pairs. Therefore, it is possible to reduce the number of optical switches provided in the optical submarine branching apparatus 10 as compared to the case where optical transmission routes are created by using 2×2 optical switches. Accordingly, as the number of input/output ports of the N×N optical switches illustrated in FIGS. 5 and 7 increases, it is possible to interchange a larger number of different fiber pairs on the trunk side, and thereby to further reduce the number of optical switches that need to be provided in the optical submarine branching apparatus.

Third Example Embodiment

Figure 12:
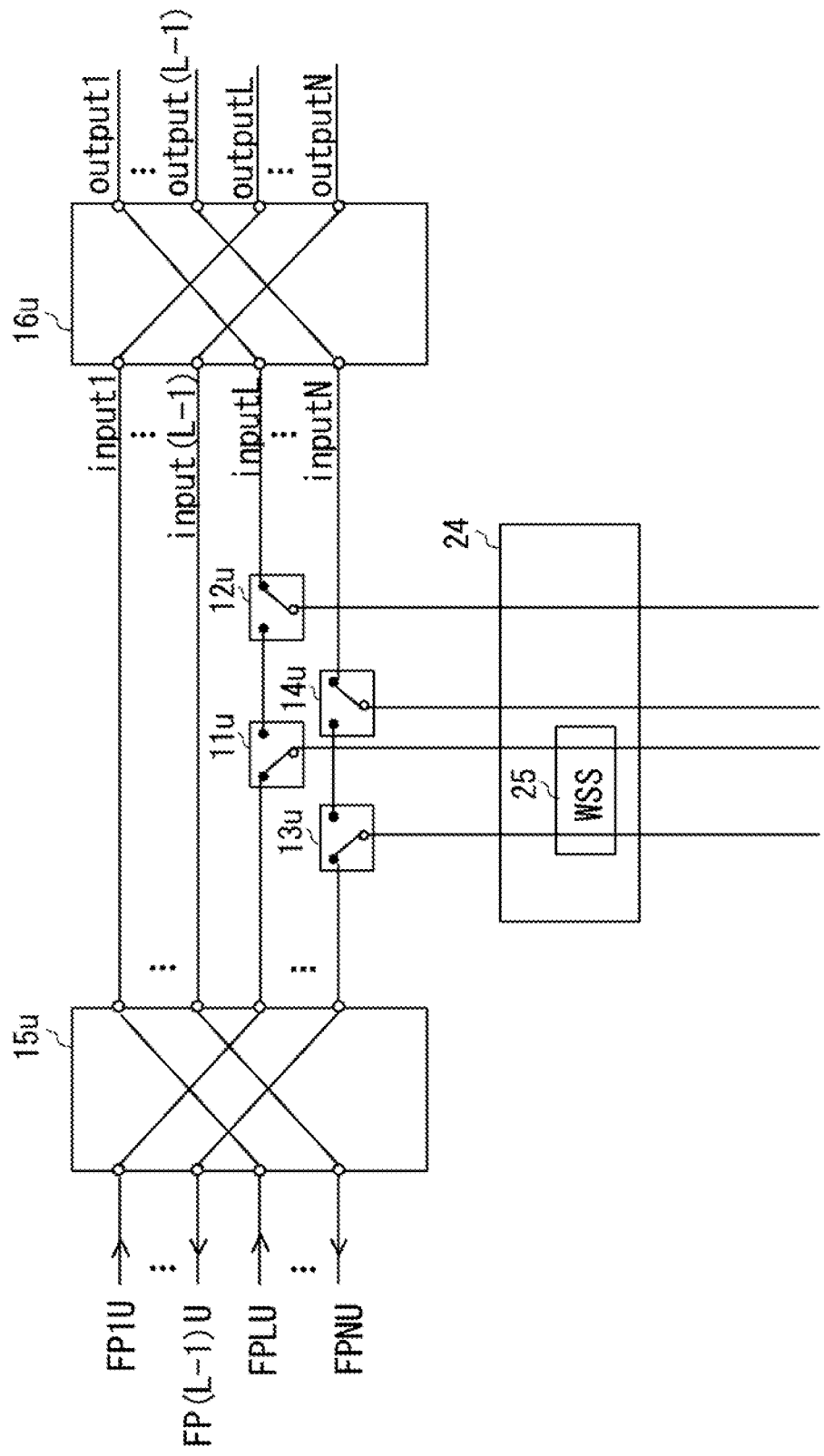
FIG. 12 is a schematic diagram illustrating a configuration example of an optical submarine cable system including an optical submarine branching apparatus according to a third example embodiment.

A third example embodiment, in particular, its differences from the second example embodiment, will be described by referring to FIG. 12 as well. However, various examples described in the first and second example embodiments can be applied to the third example embodiment as appropriate. FIG. 12 is a schematic diagram illustrating a configuration example of an optical submarine cable system including an optical submarine branching apparatus according to the third example embodiment. Note that illustration of the terminal stations 21 to 23 is omitted in FIG. 12.

The optical submarine cable system (hereinafter referred to as "this system"), part of which is illustrated in FIG. 12, is obtained by interposing a multiplexing/demultiplexing apparatus 24 between the optical submarine branching apparatus 10 and the third terminal station 23, i.e., on the branch side (e.g., branch line side), in this system, part of which is illustrated in FIG. 5. Note that although only the upstream side will be described with reference to FIG. 12, the downstream side can be configured in a similar manner.

As the multiplexing/demultiplexing apparatus 24, a submarine ROADM (Reconfigurable Optical Add/Drop Multiplexer) apparatus, which is an apparatus that adds and drops reconfigurable signals, can be used. For example, the multiplexing/demultiplexing apparatus 24 may include a WSS (Wavelength Selective Switch) 25 and may also include an optical filter (not illustrated). The WSS 25 (and the optical filter) is an example of a selecting unit that selects a wavelength.

The WSS 25 can be connected for upstream signals in the connection between the first terminal station 21 and the third terminal station 23. By switching the N×N optical switches 15u and 16u, it is possible to change the route between different fiber pairs, and thereby to change the route to a route that passes through the WSS 25 or a route that does not pass through the WSS 25.

Although the multiplexing/demultiplexing apparatus 24 having a function of selecting a wavelength that is output to the succeeding stage can be used as the submarine apparatus connected to the third optical fiber transmission lines leading to the third terminal station 23 as shown above, a simple repeater (a repeating apparatus) may also be sued as the submarine apparatus. In particular, although switching of a connection destination requires selection of a wavelength to be output to the succeeding stage, including the multiplexing/demultiplexing apparatus 24 enables the requirement to be coped with and light to be multiplexed and demultiplexed based on wavelength, using a specific fiber pair. Note that depending on the length of the optical cable, it is also possible to interpose a repeater between the multiplexing/demultiplexing apparatus 24 and the optical submarine branching apparatus, and/or between the demultiplexing/demultiplexing apparatus 24 and the third terminal station 23 in the configuration illustrated in FIG. 12. Further, as is the case of the first and second embodiments, it is also possible to interpose a repeater between the optical submarine branching apparatus and the first terminal station 21, and/or between the optical submarine branching apparatus and the second terminal station 22

Other Example Embodiment

Although, in the above-described example embodiments, the functions of the respective units in the optical submarine branching apparatus and the optical submarine cable system were described, such functions are only required to be achieved as an optical submarine branching apparatus or an optical submarine cable system. Although, in the above-described example embodiments, configurations of the optical submarine cable system were exemplified, the configurations are not limited to the exemplifications. Various examples described in the example embodiments can be appropriately combined.

Figure 13:
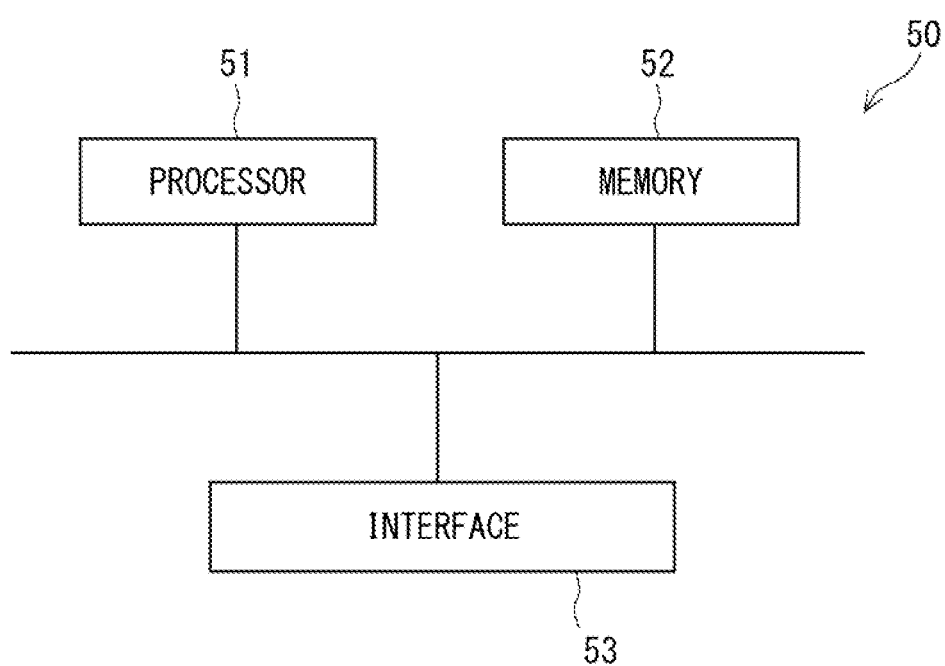
FIG. 13 is a diagram illustrating an example of a hardware configuration of a portion of each of the optical submarine branching apparatuses.

The optical submarine branching apparatuses according to the example embodiments can include the following hardware configuration. FIG. 13 is a diagram illustrating an example of a hardware configuration of a portion of each of the optical submarine branching apparatuses according to the example embodiments.

The optical submarine branching apparatus 50 illustrated in FIG. 13 includes a processor 51, a memory 52, and an interface 53. The interface 53 can be configured as an interface to a not-illustrated switching unit, such as an optical switch. The functions of the respective units described in the example embodiments can be achieved by the processor 51 reading a program stored in the memory 52 and executing the program in collaboration with the interface 53. This program can be the program described in each of the example embodiments.

In the above-described example, the program can be stored using various types of non-transitory computer readable media and provided to the computer. The non-transitory computer readable media include various types of tangible storage media. Examples of the non-transitory computer readable medium include a magnetic recording medium (such as a flexible disk, a magnetic tape, and a hard disk drive) and an optical magnetic recording medium (such as a magneto-optical disk). The examples further include a CD-read only memory (ROM), a CD-R, and a CD-R/W. The examples still further include a semiconductor memory (such as a mask ROM, a programmable ROM (PROM), an erasable PROM (EPROM), a flash ROM, and a random access memory (RAM)). The above-described program may be supplied to the computer by means of various types of transitory computer readable media. Examples of the transitory computer readable medium include an electrical signal, an optical signal, and an electromagnetic wave. The transitory computer readable medium can supply the program to the computer via a wired communication line, such as an electric wire and an optical fiber, or a wireless communication line.

Note that the present disclosure is not limited to the above-described various example embodiments and can be changed appropriately without departing from the spirit and scope of the present invention.

The present disclosure may also be carried out by arbitrarily combining respective example embodiments.

The whole or part of the example embodiments disclosed above can be described as, but not limited to, the following supplementary notes.

<Supplementary Notes>
(Supplementary Note 1)
An optical submarine branching apparatus comprising:
a first switching unit connected to N first optical fiber transmission lines connected to a first terminal station, N second optical fiber transmission lines connected to a second terminal station, and a third optical fiber transmission line connected to a third terminal station, where N is an integer equal to or greater than two, the first switching unit being configured to switch a transmission route for a wavelength-multiplexed optical signal;
a second switching unit interposed on the N first optical fiber transmission lines between the first terminal station and the first switching unit, the second switching unit being configured to switch a connection relation between in front of and behind a place where the second switching unit is interposed;
a third switching unit interposed on the N second optical fiber transmission lines between the second terminal station and the first switching unit, the third switching unit being configured to switch a connection relation between in front of and behind a place where the third switching unit is interposed; and
a control unit configured to control switching in the first, second and third switching units.
(Supplementary Note 2)
The optical submarine branching apparatus described in Supplementary note 1, wherein the optical submarine branching apparatus has a function of switching the second switching unit and the third switching unit in an interlocked manner while maintaining a switching state by the first switching unit.
(Supplementary Note 3)
The optical submarine branching apparatus described in Supplementary note 1 or 2, wherein the first switching unit has a function of connecting each of the N first optical fiber transmission lines to a respective one of the N second optical fiber transmission lines, and a function of switching any one of M first optical fiber transmission lines connected to the second switching unit so as to connect it to the third optical fiber transmission line, where M is a positive integer equal to or less than N.
(Supplementary Note 4)
The optical submarine branching apparatus described in Supplementary note 3, wherein
the first switching unit includes M first optical switches each of which includes one input path and two output paths, and
each of the M first optical switches is connected to a respective one of the M first optical fiber transmission lines.
(Supplementary Note 5)
The optical submarine branching apparatus described in Supplementary note 3 or 4, wherein the first switching unit has a function of switching any one of M second optical fiber transmission lines connected to the third switching unit so as to connect it to the third optical fiber transmission line.
(Supplementary Note 6)
The optical submarine branching apparatus described in Supplementary note 5, wherein
the first switching unit includes M second optical switches each of which includes one input path and two output paths, and
each of the M second optical switches is connected to a respective one of the M second optical fiber transmission lines.
(Supplementary Note 7)
The optical submarine branching apparatus described in any one of Supplementary notes 1 to 6, wherein each of the N first optical fiber transmission lines, the N second optical fiber transmission lines, and the third optical fiber transmission line includes a fiber pair comprising an optical fiber for optically transmitting information from the first terminal station side and an optical fiber for optically transmitting information to the first terminal station side.
(Supplementary Note 8)
The optical submarine branching apparatus described in any one of Supplementary notes 1 to 7, wherein control of switching by the control unit is performed based on a control signal extractable from a wavelength-multiplexed optical signal having been optically transmitted through at least two or more optical fiber transmission lines of the N first optical fiber transmission lines, the N second optical fiber transmission lines, and the third optical fiber transmission line.

(Supplementary Note 9)

The optical submarine branching apparatus described in any one of Supplementary notes 1 to 8, wherein, in the third optical fiber transmission line, a submarine apparatus is connected between the optical submarine branching apparatus and the third terminal station, the submarine apparatus being an apparatus for submarine installation.

(Supplementary Note 10)

The optical submarine branching apparatus described in Supplementary note 9, wherein the submarine apparatus is a multiplexing/demultiplexing apparatus having a function of selecting a wavelength to be output to a succeeding stage.

(Supplementary Note 11)

The optical submarine branching apparatus described in Supplementary note 9, wherein, to the third optical fiber transmission line, a multiplexing/demultiplexing apparatus including a function of selecting a wavelength to be output to a succeeding stage and a repeating apparatus arranged on the third terminal station side of the multiplexing/demultiplexing apparatus are connected as the submarine apparatuses.

(Supplementary Note 12)

An optical submarine cable system comprising:
a first terminal station;
a second terminal station;
a third terminal station;
an optical submarine branching apparatus;
N first optical fiber transmission lines connecting the optical submarine branching apparatus to the first terminal station;
N second optical fiber transmission lines connecting the optical submarine branching apparatus to the second terminal station; and
a third optical fiber transmission line connecting the optical submarine branching apparatus to the third terminal station, wherein
the optical submarine branching apparatus comprises:
a first switching unit connected to the N first optical fiber transmission lines connected to the first terminal station, the N second optical fiber transmission lines connected to the second terminal station, and the third optical fiber transmission line connected to the third terminal station, where N is an integer equal to or greater than two, the first switching unit being configured to switch a transmission route for a wavelength-multiplexed optical signal;
a second switching unit interposed on the N first optical fiber transmission lines between the first terminal station and the first switching unit, the second switching unit being configured to switch a connection relation between in front of and behind a place where the second switching unit is interposed;
a third switching unit interposed on the N second optical fiber transmission lines between the second terminal station and the first switching unit, the third switching unit being configured to switch a connection relation between in front of and behind a place where the third switching unit is interposed; and
a control unit configured to control switching in the first, second and third switching units.

(Supplementary Note 13)

The optical submarine cable system described in Supplementary note 12, wherein the optical submarine branching apparatus has a function of switching the second switching unit and the third switching unit in an interlocked manner while maintaining a switching state by the first switching unit.

(Supplementary Note 14)

A switching method comprising:
a first control step of controlling a first switching unit disposed inside an optical submarine branching apparatus and connected to N first optical fiber transmission lines connecting the optical submarine branching apparatus to a first terminal station, N second optical fiber transmission lines connecting the optical submarine branching apparatus to a second terminal station, and a third optical fiber transmission line connecting the optical submarine branching apparatus to a third terminal station, and thereby switching a transmission route for a wavelength-multiplexed optical signal, where N is an integer equal to or greater than two;
a second control step of controlling a second switching unit, and thereby switching a connection relation between in front of and behind a place where the second switching unit is interposed, the second switching unit being interposed on the N first optical fiber transmission lines between the first terminal station and the first switching unit, and being disposed inside the optical submarine branching apparatus; and
a third control step of controlling a third switching unit, and thereby switching a connection relation between in front of and behind a place where the third switching unit is interposed, the third switching unit being interposed on the N second optical fiber transmission lines between the second terminal station and the first switching unit, and being disposed inside the optical submarine branching apparatus.

(Supplementary Note 15)

The switching method described in Supplementary note 14, further comprising a control step of performing control for switching the second switching unit and the third switching unit in an interlocked manner while maintaining a switching state by the first switching unit.

(Supplementary Note 16)

A program for causing a control computer provided in an optical submarine branching apparatus to perform:
a first control step of controlling a first switching unit disposed inside the optical submarine branching apparatus and connected to N first optical fiber transmission lines connecting the optical submarine branching apparatus to a first terminal station, N second optical fiber transmission lines connecting the optical submarine branching apparatus to a second terminal station, and a third optical fiber transmission line connecting the optical submarine branching apparatus to a third terminal station, and thereby switching a transmission route for a wavelength-multiplexed optical signal, where N is an integer equal to or greater than two;
a second control step of controlling a second switching unit, and thereby switching a connection relation between in front of and behind a place where the second switching unit is interposed, the second switching unit being interposed on the N first optical fiber transmission lines between the first terminal station and the first switching unit, and being disposed inside the optical submarine branching apparatus; and
a third control step of controlling a third switching unit, and thereby switching a connection relation between in front of and behind a place where the third switching unit is interposed, the third switching unit being interposed on the N second optical fiber transmission lines between the second terminal station and the first switching unit, and being disposed inside the optical submarine branching apparatus.

(Supplementary Note 17)

The program described in Supplementary note 16, comprising a program for causing the control computer to perform a control step of performing control for switching the second switching unit and the third switching unit in an interlocked manner while maintaining a switching state by the first switching unit.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent application No. 2019-113509, filed on Jun. 19, 2019, the disclosure of which is incorporated herein in its entirety by reference.

REFERENCE SIGNS LIST 1, 10, 50 OPTICAL SUBMARINE BRANCHING APPARATUS
1a CONTROL UNIT
1b FIRST SWITCHING UNIT
1c SECOND SWITCHING UNIT
1d THIRD SWITCHING UNIT
11, 12, 13, 14, 11u, 12u, 13u, 14u, 11d, 12d, 13d, 14d, 31u, 32u, 41u, 42u, 43u, 44u 1×2 OPTICAL SWITCH OF FIRST SWITCHING UNIT
15u, 15d, 15 N×N OPTICAL SWITCH OF SECOND SWITCHING UNIT
16u, 16d, 16 N×N OPTICAL SWITCH OF THIRD SWITCHING UNIT
21 FIRST TERMINAL STATION
22 SECOND TERMINAL STATION
23 THIRD TERMINAL STATION
24 MULTIPLEXING/DEMULTIPLEXING APPARATUS
25 WSS
35u 2×2 OPTICAL SWITCH OF SECOND SWITCHING UNIT
36u 2×2 OPTICAL SWITCH OF THIRD SWITCHING UNIT
45u 4×4 OPTICAL SWITCH OF SECOND SWITCHING UNIT
46u 4×4 OPTICAL SWITCH OF THIRD SWITCHING UNIT
51 PROCESSOR
52 MEMORY
53 INTERFACE

What is claimed is:

1. An optical submarine branching apparatus comprising:
a first switching unit connected to N first optical fiber transmission lines connected to a first terminal station, N second optical fiber transmission lines connected to a second terminal station, and a third optical fiber transmission line connected to a third terminal station, where N is an integer equal to or greater than two, the first switching unit being configured to switch a transmission route for a wavelength-multiplexed optical signal;
a second switching unit interposed on the N first optical fiber transmission lines between the first terminal station and the first switching unit, the second switching unit being configured to switch a connection relation between in front of and behind a place where the second switching unit is interposed;
a third switching unit interposed on the N second optical fiber transmission lines between the second terminal station and the first switching unit, the third switching unit being configured to switch a connection relation between in front of and behind a place where the third switching unit is interposed; and
a control unit configured to control switching in the first, second and third switching units,
wherein the optical submarine branching apparatus is configured to be capable of switching the second switching unit and the third switching unit in an interlocked manner while maintaining a switching state by the first switching unit.

2. The optical submarine branching apparatus according to claim 1, wherein the first switching unit is configured to be capable of connecting each of the N first optical fiber transmission lines to a respective one of the N second optical fiber transmission lines, and of switching any one of M first optical fiber transmission lines connected to the second switching unit so as to connect it to the third optical fiber transmission line, where M is a positive integer equal to or less than N.

3. The optical submarine branching apparatus according to claim 2, wherein
the first switching unit includes M first optical switches each of which includes one input path and two output paths, and
each of the M first optical switches is connected to a respective one of the M first optical fiber transmission lines.

4. The optical submarine branching apparatus according to claim 2, wherein the first switching unit is configured to be capable of switching any one of M second optical fiber transmission lines connected to the third switching unit so as to connect it to the third optical fiber transmission line.

5. The optical submarine branching apparatus according to claim 4, wherein
the first switching unit includes M second optical switches each of which includes one input path and two output paths, and
each of the M second optical switches is connected to a respective one of the M second optical fiber transmission lines.

6. The optical submarine branching apparatus according claim 1, wherein each of the N first optical fiber transmission lines, the N second optical fiber transmission lines, and the third optical fiber transmission line includes a fiber pair comprising an optical fiber for optically transmitting information from the first terminal station side and an optical fiber for optically transmitting information to the first terminal station side.

7. The optical submarine branching apparatus according to claim 1, wherein control of switching by the control unit is performed based on a control signal extractable from a wavelength-multiplexed optical signal having been optically transmitted through at least two or more optical fiber transmission lines of the N first optical fiber transmission lines, the N second optical fiber transmission lines, and the third optical fiber transmission line.

8. The optical submarine branching apparatus according to claim 1, wherein, in the third optical fiber transmission line, a submarine apparatus is connected between the optical submarine branching apparatus and the third terminal station, the submarine apparatus being an apparatus for submarine installation.

9. The optical submarine branching apparatus according to claim 8, wherein the submarine apparatus is a multiplexing/demultiplexing apparatus being configured to be capable of selecting a wavelength to be output to a succeeding stage.

10. The optical submarine branching apparatus according to claim 8, wherein, to the third optical fiber transmission line, a multiplexing/demultiplexing apparatus being configured to be capable of selecting a wavelength to be output to a succeeding stage and a repeating apparatus arranged on the third terminal station side of the multiplexing/demultiplexing apparatus are connected as the submarine apparatuses.

11. An optical submarine cable system comprising:
   a first terminal station;
   a second terminal station;
   a third terminal station;
   N first optical fiber transmission lines;
   N second optical fiber transmission lines;
   a third optical fiber transmission line; and
   an optical submarine branching apparatus according to claim 1, wherein
   the N first optical fiber transmission lines connect the optical submarine branching apparatus and to the first terminal station,
   the N second optical fiber transmission lines connect the optical submarine branching apparatus and to the second terminal station, and
   the third optical fiber transmission line connects the optical submarine branching apparatus and the third terminal station,
   wherein the optical submarine branching apparatus is configured to be capable of switching the second switching unit and the third switching unit in an interlocked manner while maintaining a switching state by the first switching unit.

12. A switching method comprising:
   controlling a first switching unit disposed inside an optical submarine branching apparatus and connected to N first optical fiber transmission lines connecting the optical submarine branching apparatus to a first terminal station, N second optical fiber transmission lines connecting the optical submarine branching apparatus to a second terminal station, and a third optical fiber transmission line connecting the optical submarine branching apparatus to a third terminal station, and thereby switching a transmission route for a wavelength-multiplexed optical signal, where N is an integer equal to or greater than two;
   controlling a second switching unit, and thereby switching a connection relation between in front of and behind a place where the second switching unit is interposed, the second switching unit being interposed on the N first optical fiber transmission lines between the first terminal station and the first switching unit, and being disposed inside the optical submarine branching apparatus;
   controlling a third switching unit, and thereby switching a connection relation between in front of and behind a place where the third switching unit is interposed, the third switching unit being interposed on the N second optical fiber transmission lines between the second terminal station and the first switching unit, and being disposed inside the optical submarine branching apparatus; and
   controlling for switching the second switching unit and the third switching unit in an interlocked manner while maintaining a switching state by the first switching unit.

13. A non-transitory computer readable medium storing a program for causing a control computer provided in an optical submarine branching apparatus to perform:
   controlling a first switching unit disposed inside the optical submarine branching apparatus and connected to N first optical fiber transmission lines connecting the optical submarine branching apparatus to a first terminal station, N second optical fiber transmission lines connecting the optical submarine branching apparatus to a second terminal station, and a third optical fiber transmission line connecting the optical submarine branching apparatus to a third terminal station, and thereby switching a transmission route for a wavelength-multiplexed optical signal, where N is an integer equal to or greater than two;
   controlling a second switching unit, and thereby switching a connection relation between in front of and behind a place where the second switching unit is interposed, the second switching unit being interposed on the N first optical fiber transmission lines between the first terminal station and the first switching unit, and being disposed inside the optical submarine branching apparatus;
   controlling a third switching unit, and thereby switching a connection relation between in front of and behind a place where the third switching unit is interposed, the third switching unit being interposed on the N second optical fiber transmission lines between the second terminal station and the first switching unit, and being disposed inside the optical submarine branching apparatus; and
   controlling for switching the second switching unit and the third switching unit in an interlocked manner while maintaining a switching state by the first switching unit.

* * * * *